United States Patent
Jiang et al.

(10) Patent No.: US 11,863,801 B2
(45) Date of Patent: Jan. 2, 2024

(54) METHOD AND DEVICE FOR GENERATING LIVE STREAMING VIDEO DATA AND METHOD AND DEVICE FOR PLAYING LIVE STREAMING VIDEO

(71) Applicant: Shanghai Bilibili Technology Co., Ltd., Shanghai (CN)

(72) Inventors: Jun Jiang, Shanghai (CN); Junwei Zhu, Shanghai (CN); Yongfang Qin, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 33 days.

(21) Appl. No.: 17/392,711

(22) Filed: Aug. 3, 2021

(65) Prior Publication Data
US 2022/0046291 A1     Feb. 10, 2022

(30) Foreign Application Priority Data

Aug. 4, 2020 (CN) .................... 202010772489.X

(51) Int. Cl.
*H04N 21/2187* (2011.01)
*H04N 19/70* (2014.01)
(Continued)

(52) U.S. Cl.
CPC ......... *H04N 21/2187* (2013.01); *G06V 10/44* (2022.01); *G06V 20/49* (2022.01);
(Continued)

(58) Field of Classification Search
CPC ............... H04N 21/2187; H04N 19/70; H04N 21/23418; H04N 21/4312; H04N 21/4316;
(Continued)

(56) References Cited

U.S. PATENT DOCUMENTS 10,277,901 B2 *  4/2019  Danielsson Fan ... H04N 19/137
10,740,891 B1 *  8/2020  Chen ...................... G06Q 40/08
(Continued)

FOREIGN PATENT DOCUMENTS

CN     108616772 A    10/2018
CN     109151489 A    1/2019
(Continued)

OTHER PUBLICATIONS

CN-112492324-A English Translation (Year: 2021).*

*Primary Examiner* — Fernando Alcon
(74) *Attorney, Agent, or Firm* — BakerHostetler

(57) ABSTRACT

The present disclosure describes techniques for generating live streaming video data and playing live streaming video. The techniques comprise obtaining live broadcasting video data; identifying a target object in a video frame; determining a target area based on the target object in the video frame; encoding data indicative of the target area based on a predetermined format for supplementary enhancement information to obtain encoded target area data; and adding the encoded target area data to a data packet corresponding to the video frame, wherein the data packet is encoded based on a predetermined video data format, and wherein the predetermined video data format and the predetermined format for supplementary enhancement information are mutually compatible data encoding formats.

15 Claims, 7 Drawing Sheets

(51) Int. Cl.
*G06V 20/40* (2022.01)
*G06V 10/44* (2022.01)
*H04N 21/234* (2011.01)
*H04N 21/431* (2011.01)

(52) U.S. Cl.
CPC ....... *H04N 19/70* (2014.11); *H04N 21/23418* (2013.01); *H04N 21/4312* (2013.01)

(58) Field of Classification Search
CPC ........... H04N 21/4318; H04N 21/4886; H04N 21/8126; H04N 21/44008; H04N 21/435; G06V 10/44; G06V 20/49
See application file for complete search history.

(56) References Cited

U.S. PATENT DOCUMENTS 10,757,347 B1 * 8/2020 Corwin .............. H04N 21/4316
2015/0326946 A1 * 11/2015 Sankaranarayanan ...................... H04N 21/44
725/34
2019/0020880 A1 * 1/2019 Wang ...................... G06F 3/011
2019/0132627 A1 * 5/2019 Loheide .............. H04N 21/2625
2019/0253757 A1 * 8/2019 Leister ............... H04N 21/4318
2020/0058270 A1 * 2/2020 Li ...................... H04N 21/4312
2021/0120319 A1 * 4/2021 Zhou ................ H04N 21/23614
2022/0014819 A1 * 1/2022 Liu .................. H04N 21/23418

FOREIGN PATENT DOCUMENTS

| CN | 109302619 A | 2/2019 | |
|---|---|---|---|
| CN | 109309861 A | 2/2019 | |
| CN | 109688457 A | 4/2019 | |
| CN | 111246232 A | 6/2020 | |
| CN | 112492324 A | * 3/2021 | ......... H04N 21/2187 |

* cited by examiner

METHOD AND DEVICE FOR GENERATING LIVE STREAMING VIDEO DATA AND METHOD AND DEVICE FOR PLAYING LIVE STREAMING VIDEO

CROSS-REFERENCE TO RELATED APPLICATION

The present application declares priority of the Chinese patent application with number CN 202010772489.X, filed on Aug. 4, 2020, entitled "method and device for generating live streaming video data and method and device for playing live streaming video". Entire content of the Chinese patent application is incorporated in the present application by reference.

BACKGROUND

With the progress of network communication technology and the acceleration of broadband networks, network video technology has also been increasingly developed and applied. Service providers such as video providing platforms and live streaming platforms can also provide users with more and more rich video experiences. In order to enhance user's sense of participation and interactivity when watching the video, the user's comment contents can also be displayed during the process of playing a live streaming video. These comment contents fly from one side to the other side of a video playing screen like bullets, so these comment contents are called bullet screen.

SUMMARY

When playing the live streaming video, it often happens that the bullet screens occlude the face and key objects in the video screen while there are a large number of bullet screens. Of course, the existing live streaming video playing technology may also provide a switch function of bullet screen displaying, and through turning off the bullet screen displaying, the occlusion problem of bullet screens can be effectively avoided. However, this loses the sense of interaction and viewing pleasure brought by the bullet screens. Therefore, there is an urgent need for a method for playing a live streaming video that not only displays the bullet screens during the process of playing the live streaming video, but also prevents the bullet screens from occluding target objects.

The present application provides a method and a device for playing a live streaming video, which can solve the problem that contents of bullet screens occlude target objects in a video screen during playing a video in the prior art.

First, in order to achieve the above objective, the present application provides a method for generating live streaming video data, and the method includes:

obtaining live streamer video data, identifying target object data of a first video frame in the live streamer video data, wherein the first video frame is any video frame in the live streamer video data; calculating anti-occlusion area data of the first video frame according to the target object data; and adding the anti-occlusion area data to a data packet corresponding to the first video frame to generate a second video frame of the live streaming video data.

In one embodiment, the calculating anti-occlusion area data of the first video frame according to the target object data, includes: performing a vector stroke on the target object data to obtain target object contour data of the first video frame; marking an area covered by the target object contour data in the first video frame as an anti-occlusion area; and counting coordinate points within the anti-occlusion area, and calculating the anti-occlusion area data describing the anti-occlusion area.

In one embodiment, when the live streamer video data is real-time video data captured by a camera, the method further includes: obtaining video parameters for a video software to perform video screen synthesis on the first video frame; and correcting the target object contour data according to the video parameters.

In one embodiment, the adding the anti-occlusion area data to a data packet corresponding to the first video frame, includes: encoding the anti-occlusion area data according to a preset supplementary enhancement information format to obtain encoded anti-occlusion area data; and adding the encoded anti-occlusion area data to the data packet of an encoded first video frame encoded according to a preset video data format, wherein the video data format and the supplementary enhancement information format are mutually compatible data encoding formats.

In one embodiment, the identifying target object data of a first video frame in the live streamer video data, includes: identifying the target object data in the first video frame through a preset target object recognition model; or when the live streamer video data is video data captured by a virtual camera, cutting out data in the first video frame except the target object data by means of a green screen matting, so as to obtain the target object data.

Further, the present application also provides a method for playing a live streaming video, and the method includes:

receiving live streaming video data and corresponding bullet screen data; parsing a second video frame of the live streaming video data, and directly extracting anti-occlusion area data of the second video frame, wherein the second video frame is any video frame in the live streaming video data; establishing a bullet screen mask corresponding to the second video frame according to the anti-occlusion area data; and when the second video frame is played, displaying target bullet screen data corresponding to the second video frame on the bullet screen mask.

In one embodiment, the establishing a bullet screen mask corresponding to the second video frame according to the anti-occlusion area data, includes: drawing an anti-occlusion area range on a video frame image of the second video frame according to the anti-occlusion area data; and setting an anti-occlusion block corresponding to the anti-occlusion area range in a preset initial bullet screen mask of the second video frame, and taking the initial bullet screen mask having been set the anti-occlusion block as the bullet screen mask corresponding to the second video frame.

In one embodiment, the method further includes: when the target bullet screen data is displayed on the bullet screen mask, if the target bullet screen data overlaps with the anti-occlusion block, transparently displaying an overlapping part of the target bullet screen data.

In addition, in order to achieve the above objective, the present application also provides a device for generating live streaming video data, and the device includes:

an identifying module, obtaining live streamer video data, identifying target object data of a first video frame in the live streamer video data, wherein the first video frame is any video frame in the live streamer video data; a calculating module, calculating anti-occlusion area data of the first video frame according to the target object data; and a generating module, adding the anti-occlusion area data to a data packet corresponding to the first video frame to generate a second video frame of the live streaming video data.

And, the present application also provides a device for playing live streaming video, and the device includes:

a receiving module, receiving live streaming video data and corresponding bullet screen data; a parsing module, parsing a second video frame of the live streaming video data, and directly extracting anti-occlusion area data of the second video frame, wherein the second video frame is any video frame in the live streaming video data; an establishing module, establishing a bullet screen mask corresponding to the second video frame according to the anti-occlusion area data; and a displaying module, when the second video frame is played, displaying target bullet screen data corresponding to the second video frame on the bullet screen mask.

Compared with the prior art, the method and device for playing live streaming video proposed in the present application can receive live streaming video data and corresponding bullet screen data; parses a second video frame of the live streaming video data, and directly extracts anti-occlusion area data of the second video frame, wherein the second video frame is any video frame in the live streaming video data; establishes a bullet screen mask corresponding to the second video frame according to the anti-occlusion area data; and when the second video frame is played, displays target bullet screen data corresponding to the second video frame on the bullet screen mask. Through setting the anti-occlusion area data in the video frame to the corresponding video frame, so that during the process of playing a video, the corresponding anti-occlusion bullet screen mask is quickly established according to the anti-occlusion area data in the video frame, realizing the anti-occlusion effect of the corresponding video frame.

DETAILED DESCRIPTION OF ILLUSTRATIVE EMBODIMENTS

In order to make the purpose, technical solutions, and advantages of the present application clearer, the following further describes the present application in detail with reference to the accompanying drawings and embodiments. It should be understood that the specific embodiments described here are only used to explain the present application, and not used to limit the present application. Based on the embodiments in the present application, all other embodiments obtained by those of ordinary skills in the art without creative work are falling within the protection scope of the present application.

It should be noted that the descriptions related to "first", "second" and so on in the embodiments of the present application are only for descriptive purposes, and cannot be understood as indicating or implying their relative importance or implicitly specifying the indicated technical features quantity. Therefore, the features defined with "first" and "second" may explicitly or implicitly include at least one of the features. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, and is not within the scope of protection required by the present application.

Figure 1:
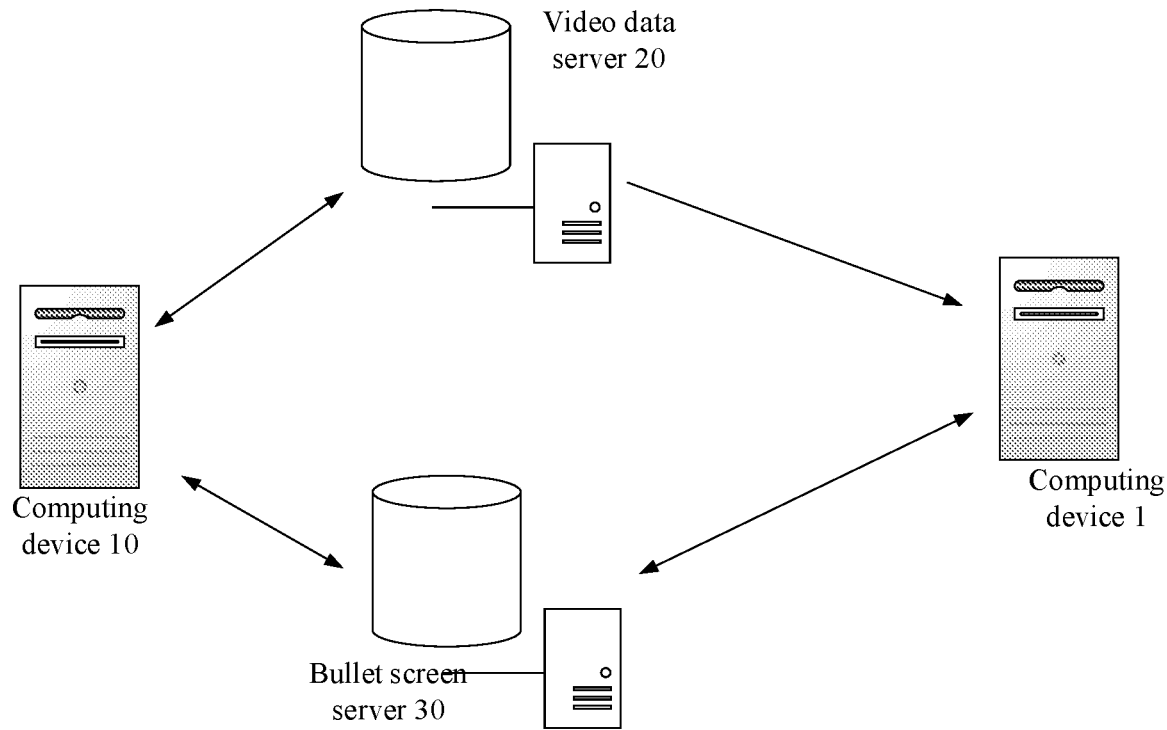
FIG. 1 is a schematic diagram of an application environment according to an embodiment of the present application.

FIG. 1 is a schematic diagram of an application environment according to an embodiment of the present application. Referring to FIG. 1, a computing device 10 and a computing device 1 are respectively connected to a video data server 20 and a bullet screen server 30. The computing device 10 can generate corresponding live streaming video data from obtained live streamer video data, and then upload the live streaming video data to the video data server 20; the computing device 10 can also receive video data from the video data server 20, and receive bullet screen data from the bullet screen server 30, and then perform playing; and the computing device 10 can also send the bullet screen data to the bullet screen server 30 when playing the video data. In the embodiment, both the computing device 1 and the computing device 10 can be mobile phones, tablets, portable devices, PCs, or other electronic devices with display functions. In an illustrative example, for example, in the process of live streaming, the computing device 10, as a live streamer side, needs to have a capturing function and can capture video data by itself; and the computing device 1, as a user side, may not have the capturing function. It is worth noting that the computing device 1 and the computing device 10 may have a capturing function at the same time, and then a type of the live streamer side can be switched to a type of the user side during the process of playing a video.

First embodiment

Figure 2:
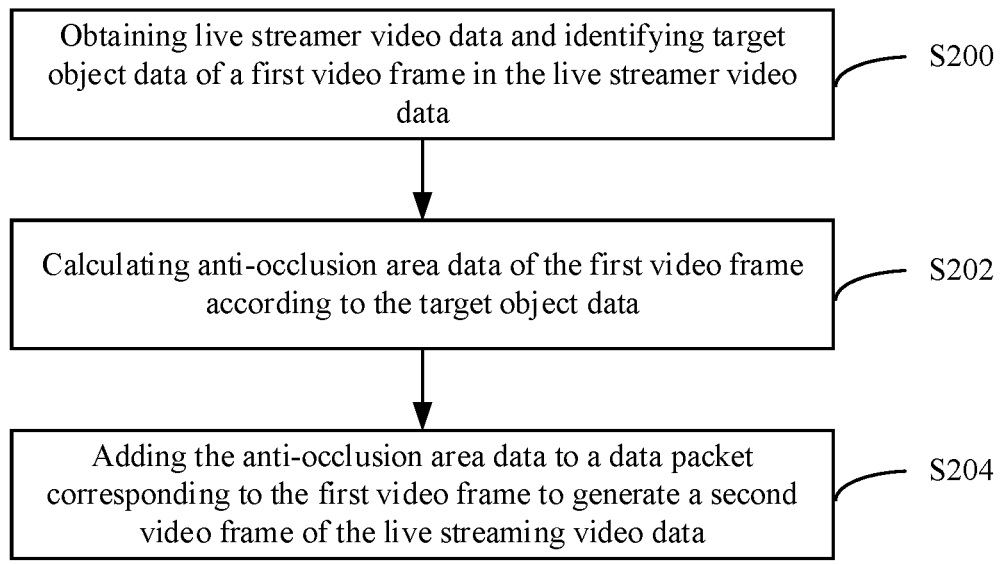
FIG. 2 is a schematic flowchart of a method for generating live streaming video data according to a specific embodiment of the present application.

FIG. 2 is a schematic flowchart of a method for generating live streaming video data according to an embodiment of the present application. It can be understood that the flowchart in the method embodiment is not used to limit the order of execution of the steps. The following exemplarily describes the computing device 10 as the execution subject.

As shown in FIG. 2, the method for generating live streaming video data may include steps S200 to S206.

Step S200, obtaining live streamer video data and identifying target object data of a first video frame in the live streamer video data, wherein the first video frame is any video frame in the live streamer video data.

Step S202, calculating anti-occlusion area data of the first video frame according to the target object data.

Step S204, adding the anti-occlusion area data to a data packet corresponding to the first video frame to generate a second video frame of the live streaming video data.

With the development of network video technology, video services have also been widely used. Among them, a live streaming service is generally that the live streamer side requests to establish a live room on the video server, and then uploads the video data to the video data server as to-be-played video data, and the video data server pushes the to-be-played video data to the user side of the live room. Therefore, the live streamer side can share the video data uploaded by the live streamer side, including real-time video data and non-real-time video data, with the user side.

In the embodiment, the computing device 10 is used as the live streamer side to establish the live room, and then upload the video data to the video data server. Specifically, the computing device 10 first obtains the live streamer video data, the live streamer video data may be real-time video data captured by a camera unit of the computing device 10, or received video data captured by other devices, wherein, the live streamer video data may also be virtual capturing data. Next, the computing device 10 identifies the obtained live streamer video data, and identifies the target object data of the first video frame in the live streamer video data. Wherein, the first video frame is any video frame in the live streamer video data.

Figure 3:
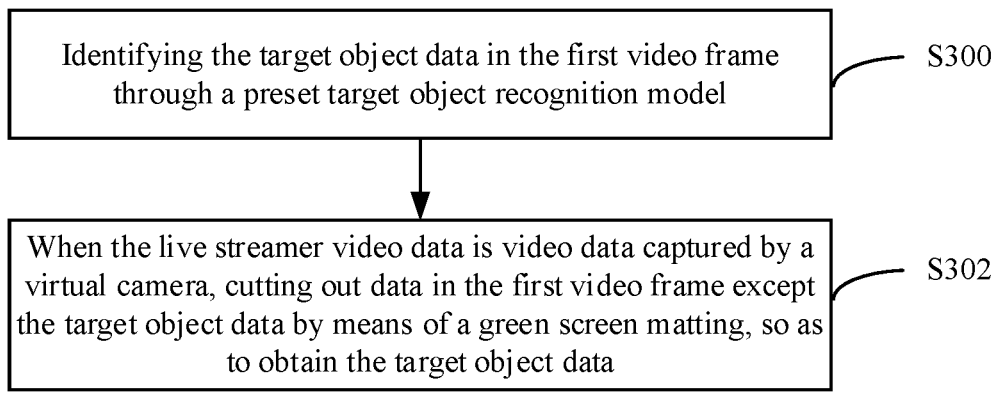
FIG. 3 is a schematic flowchart of a specific embodiment of step S200 in the FIG. 2.

Referring to FIG. 3, in an exemplary example, step S200 may include the following steps:

Step S300, identifying the target object data in the first video frame through a preset target object recognition model.

Step S302, when the live streamer video data is video data captured by a virtual camera, cutting out data in the first video frame except the target object data by means of a green screen matting, so as to obtain the target object data.

In a specific embodiment, when the video data obtained by the computing device 10 is video data captured by a real camera, then, after the live streamer video data is obtained, the computing device 10 identifies each video frame of the live streamer video data through the preset target object recognition model to identify the target object therein. For example, the target object may be a human face, a portrait, an animal, a plant, or other objects; the target object recognition model is the preset image recognition model that can recognize the human face, the portrait, the animal, the plant, or other objects; and the computing device 10 can identify each frame in the live streamer video data through the target object recognition model, thereby identifying the target object data in each video frame.

In another specific embodiment, when the video data obtained by the computing device 10 is video data captured by the virtual camera (that is, a virtual live streamer is live), a virtual camera software used by the virtual live streamer can directly output an image with a green screen (For the video data captured by the virtual camera, except for several key target object data, the other background data are all green screen backgrounds automatically supplemented, and the green screen backgrounds are used for replacement during post video frame editing). For example, the computing device 1 may perform the green screen matting for each video frame in the live streamer video data through a green screen matting function of an OBS (Open Broadcaster Software) of live streaming. A green screen is a backdrop for special effects shots of movies, actors perform in front of the green screen. Taken with a camera, when images are processed in a computer, the green of the background is cut out and replaced with other backgrounds. Therefore, the computing device 10 can cut out all the data except the target object data in each video frame of the video data by means of green screen matting, thereby the target object data is obtained. In a specific embodiment, the computing device 10 may establish a filter capable of filtering green screen data, and then filter each video frame of the live streamer video data. For example, if the target object is the portrait, the computing device 10 filters out the green screen background behind portrait data by means of the filter, thereby the portrait data is left.

Figure 4:
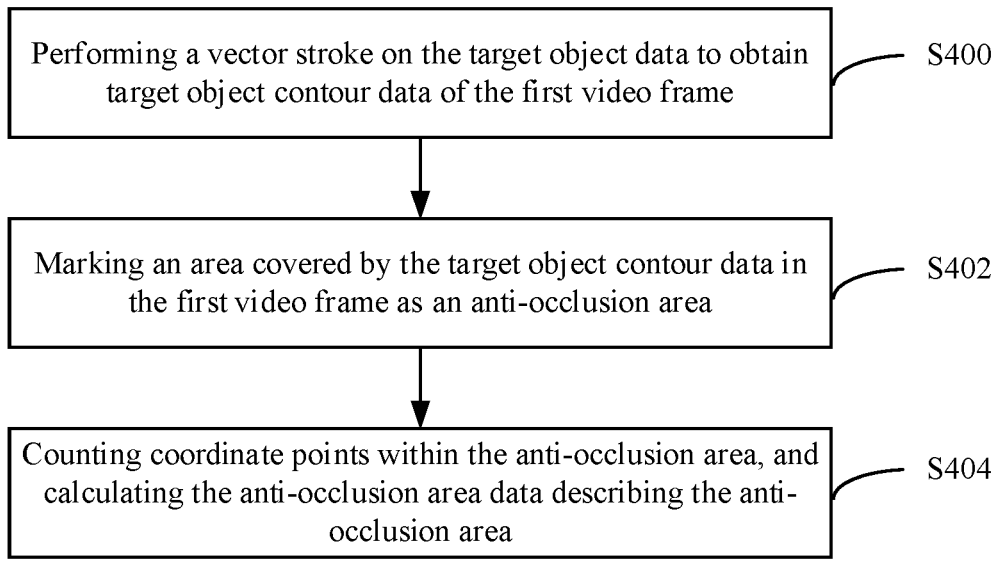
FIG. 4 is a schematic flowchart of a specific embodiment of step S202 in the FIG. 2.

Referring to FIG. 4, in an exemplary example, the step S202 may include the following steps:

Step S400, performing a vector stroke on the target object data to obtain target object contour data of the first video frame.

Step S402, marking an area covered by the target object contour data in the first video frame as an anti-occlusion area.

Figure 5:
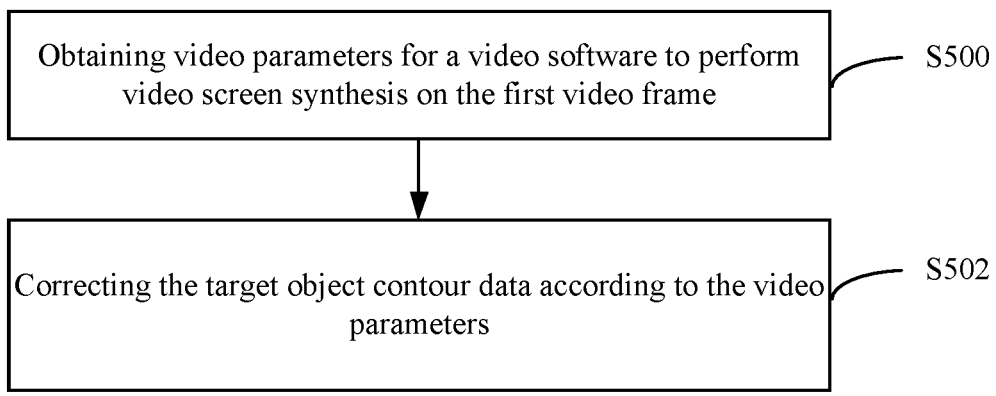
FIG. 5 is a schematic flowchart of a specific embodiment when live streamer video data is real-time video data captured by a camera in the step S202 in the FIG. 2.

Step S404, counting coordinate points within the anti-occlusion area, and calculating the anti-occlusion area data describing the anti-occlusion area. After the target object data of each video frame in the live streamer video data is identified, the computing device 10 further calculates the anti-occlusion area data of each video frame according to the target object data of each video frame. In the embodiment, the computing device 1 may obtain a series of coordinates of key points by stroking the target object data. These coordinates can be connected smoothly to restore a position of the portrait. Therefore, the coordinate point data is the target object contour data of the target object. Next, the computing device 10 marks the area covered by the target object contour data in the first video frame as the anti-occlusion area; and counts the coordinate points within the anti-occlusion area to calculate the anti-occlusion area data describing the anti-occlusion area. For example, by performing a curve regression analysis on the coordinate points in the target object contour data, a plurality of curve functions describing the anti-occlusion area are obtained as the anti-occlusion area data corresponding to the target object data. Of course, in other embodiments, the anti-occlusion area data of the anti-occlusion area can also be calculated in other ways. In this way, the target object data can be converted into the anti-occlusion area data, which can greatly reduce information capacity and be beneficial to network transmission. Referring to FIG. 5, in an exemplary example, when the live streamer video data is real-time video data captured by a camera, the step S202 may include the following steps:

Step S500, obtaining video parameters for a video software to perform video screen synthesis on the first video frame.

Step S502, correcting the target object contour data according to the video parameters.

Specifically, when the live streamer video data is the real-time video data shot by the computing device 10, then the computing device 10 also adjusts the video image of the live streaming video data through the video software, thereby giving the live streaming video data a default video picture format, such as, a size, a center position of the video frame, and a deflection and other transmit video parameters.

Therefore, the computing device 10 obtains the video parameters, then corrects the target object contour data according to the video parameters. In the embodiment, because the live streamer video data captured by the computing device 10 through the camera is performed screen synthesis through the software of live streaming, such as, changing the size, changing the position, rotating and flipping and other processing. Therefore, the target object contour data needs to be performed the same transformation, so that the coordinates of the key points of the target object data corresponding to the target object contour data can correspond to a final generated live screen.

Finally, the computing device 10 adds the anti-occlusion area data to the data packet corresponding to the first video frame to generate the second video frame of the live streaming video data. In other words, the computing device 10 can convert all the video frames of the live streamer video data to obtain corresponding live streaming video data.

Figure 6:
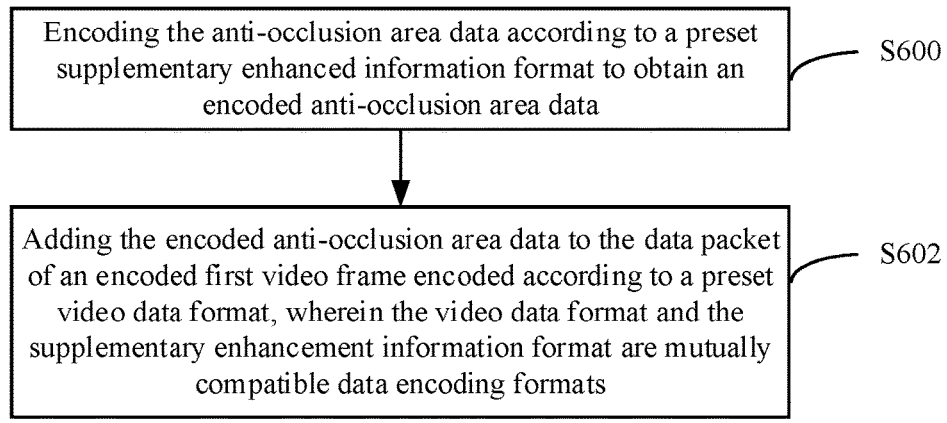
FIG. 6 is a schematic flowchart of a specific embodiment of adding anti-occlusion area data a data packet corresponding to a first video frame in step S204 in the FIG. 2.

Referring to FIG. 6, in an illustrative example, in the step S204, the adding the anti-occlusion area data to a data packet corresponding to the first video frame, includes the following steps:

Step S600, encoding the anti-occlusion area data according to a preset supplementary enhanced information format to obtain an encoded anti-occlusion area data.

Step S602, adding the encoded anti-occlusion area data to the data packet of an encoded first video frame encoded according to a preset video data format, wherein the video data format and the supplementary enhancement information format are mutually compatible data encoding formats.

Specifically, after the anti-occlusion area data corresponding to the first video frame is obtained by the computing device 10, the anti-occlusion area data corresponding to the first video is added to the data packet corresponding to the first video frame by means of supplementary enhanced information, thereby forming the video frame corresponding to the live streaming video data. In the embodiment, for example, live streaming refers to a form of entertainment that broadcasts live images publicly via the Internet. Nowadays, live streaming usually use forms of flv (flash video), segmented MP4 (MPEG-4) and the like to transmit encoded video and audio signals. Currently, the most popular video encoding method is MPEG-4/AVC, also known as H.264, and the audio encoding method is MPEG-4/AAC. H.264 has an international standard, which defines a data format and transmission protocol. In the standard, except for video data, the "supplementary enhancement information" part is also defined, which allows users to insert custom data. Therefore, the anti-occlusion area data is encapsulated into a customized supplementary enhancement information data packet according to a H.264 white paper standard, and inserted into the data packet of corresponding video frame in the live H.264 stream. For example, the anti-occlusion area data will be encoded by the protocol described in section 1.7 of Appendix D in the H.264 white paper, and inserted into the data stream of the second video frame. Because the anti-occlusion area data is complied with the white paper standard, and compatible with the existing system, therefore most of the content distribution network, server and other facilities do not need to perform specially modification.

Of course, in other embodiments, the computing device 10 selects a compatible data format that can be inserted into the video frame data to encode the anti-occlusion area data according to the encoding format of the video frame of the live streamer video data, and insert the encoded anti-occlusion area data into data packet of corresponding video frame to obtain the video frame corresponding to the live streaming video data.

Finally, the computing device 10 uploads the live streaming video data to the video data server.

Figure 7:
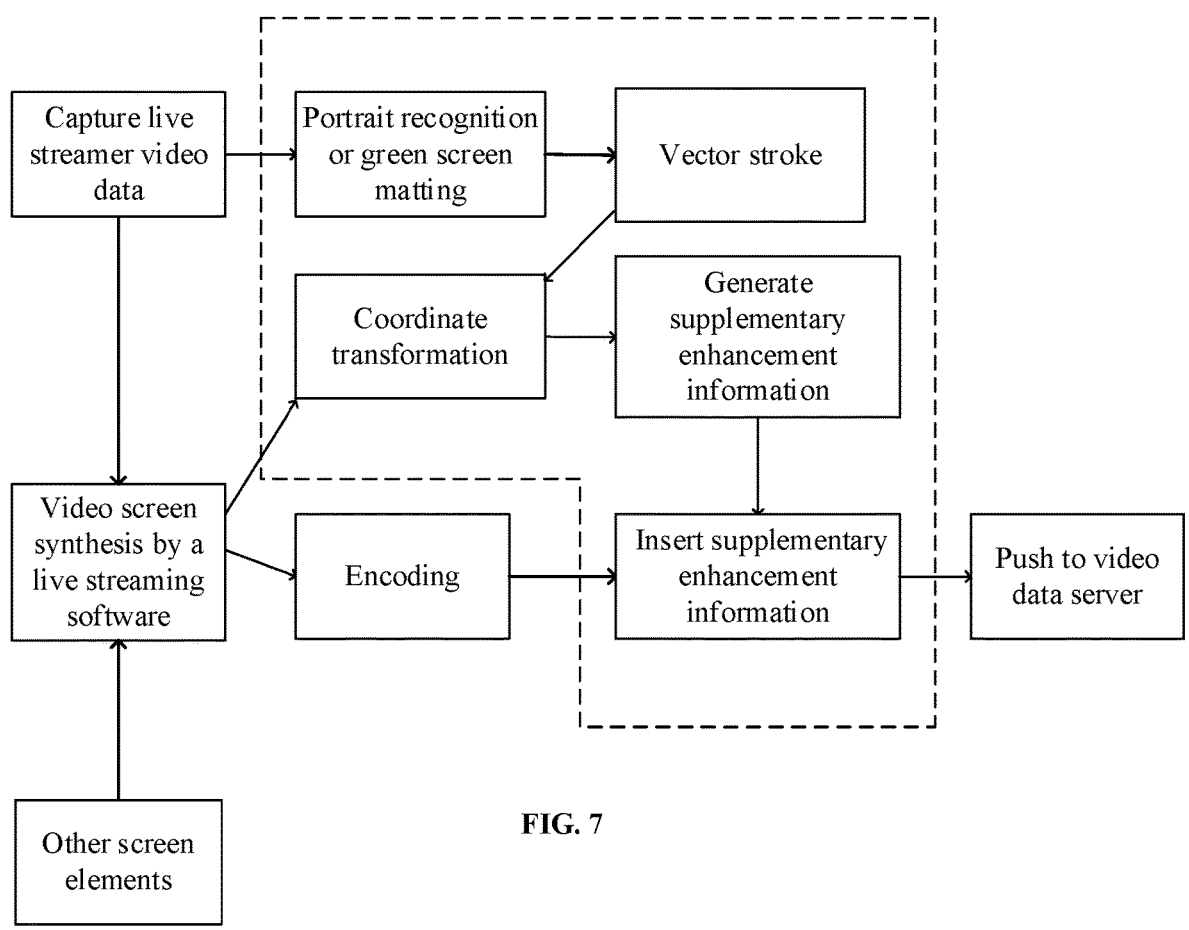
FIG. 7 is a flow effect diagram of a method for generating live streaming video data according to a specific embodiment of the present application.

Referring to FIG. 7, FIG. 7 is a flow effect diagram of a method for generating live streaming video data according to an embodiment of the present application. In the embodiment, the computing device 10 is the live streamer side of a live streaming, so the live streamer video data can be captured by the camera. On the one hand, the computing device 10 synthesizes each video frame of the live streamer video data with other screen elements, such as virtual backgrounds or artistic effects, through live streaming software, thereby a composite video frame is obtained. Then, the composite video frame is encoded to obtain the encoded composite video frame. On the other hand, the computing device 10 performs portrait recognition or green screen matting on the video frame of the captured live streamer video data, thereby the target object is obtained, that is, the portrait data; then, performs the vector stroke to obtain the target object contour data corresponding to the video frame; and then according to the video parameters for a video software to perform video screen synthesis on the live streamer video data, performs corresponding corrections on the target object contour data, that is, performs coordinate transformation on the coordinate data in the target object contour data, and calculates the corresponding anti-occlusion area data according to the corrected target object contour data; then, the anti-occlusion area data is encoded into supplementary enhancement information, and inserted into the data packet of the corresponding encoded composite video frame, thereby the live streaming video data is obtained; finally, the computing device 10 pushes the live streaming video data to the video data server.

Second embodiment

Figure 8:
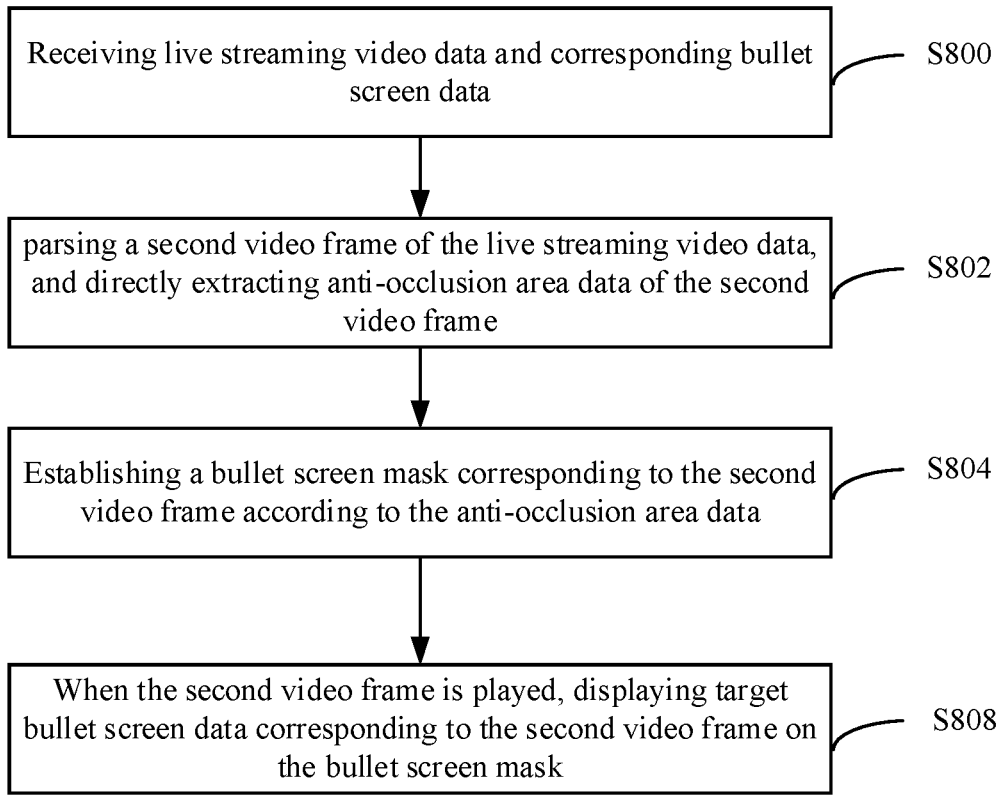
FIG. 8 is a schematic flowchart of a method for playing live streaming video according to a specific embodiment of the present application.

FIG. 8 is a schematic flowchart of a method for playing live streaming video of the present application. It can be understood that the flowchart in the embodiment of the method is not used to limit the order of execution of the steps. The following exemplarily describes the computing device 1 as the execution subject.

As shown in FIG. 8, the method for playing live streaming video data may include steps S800 to S808.

Step S800, receiving live streaming video data and corresponding bullet screen data.

Step S802, parsing a second video frame of the live streaming video data, and directly extracting anti-occlusion area data of the second video frame, wherein the second video frame is any video frame in the live streaming video data.

Step S804, establishing a bullet screen mask corresponding to the second video frame according to the anti-occlusion area data.

Step S808, when the second video frame is played, displaying target bullet screen data corresponding to the second video frame on the bullet screen mask.

Specifically, after joining the live room created by the computing device 10, the computing device 1 can obtain the live streaming video data uploaded by the computing device 10 from the video data server. Wherein, the bullet screen data corresponding to the live streaming video data can also be received from the bullet screen server. For example, when the live streaming video data is played by the computing device 10 or other computing devices (not shown in FIG. 1); during the playing process, the computing device 10 or other computing devices may also send corresponding bullet screen data for the playing live streaming video data, the bullet screen data is uploaded to the bullet screen server. For example, when the second video frame of the live streaming video data is played, the bullet screen data sent will be associated with the second video frame and saved in the bullet screen server. Therefore, when the computing device 1 receives live streaming video data from the video data server, can also receive corresponding bullet screen data from the bullet screen server at the same time.

Then, the computing device 1 will further parse the second video frame of the live streaming video data, and directly extract the anti-occlusion area data therein. In the embodiment, the computing device 1 searches out the data of the supplementary enhancement information format from the second video frame according to the supplementary enhancement information format, and extracts the anti-occlusion area data corresponding to the second video frame; then establishes the bullet screen mask corresponding to the second video frame according to the anti-occlusion area data.

Figure 9:
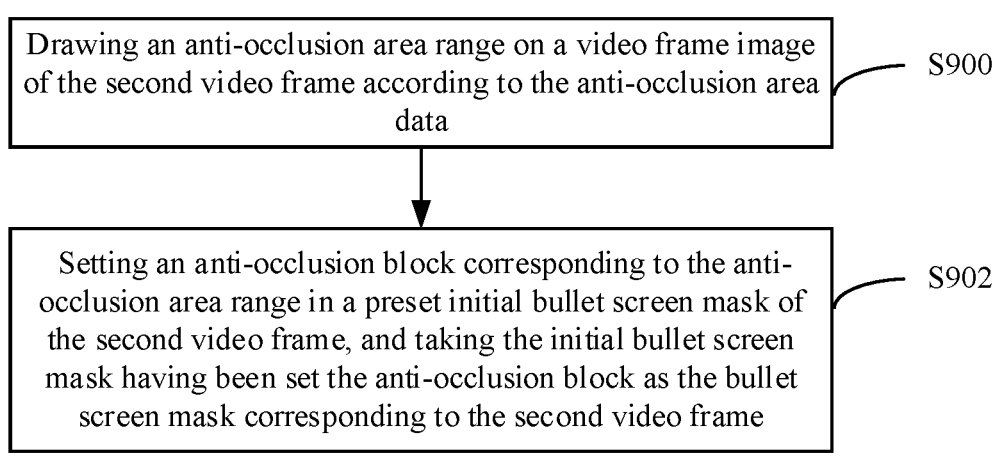
FIG. 9 is a schematic flowchart of a specific embodiment of step S804 in the FIG. 8.

Referring to FIG. 9, in an exemplary example, the step S804 may include the following steps:

Step S900, drawing an anti-occlusion area range on a video frame image of the second video frame according to the anti-occlusion area data.

Step S902, setting an anti-occlusion block corresponding to the anti-occlusion area range in a preset initial bullet screen mask of the second video frame, and taking the initial bullet screen mask having been set the anti-occlusion block as the bullet screen mask corresponding to the second video frame.

Specifically, after obtaining the anti-occlusion area data corresponding to the second video frame from the second video frame of the live streaming video data, the computing device 1 further draws the anti-occlusion area range according to the anti-occlusion area data. For example, if the anti-occlusion area data includes a plurality of curve functions, the computing device 1 will draw a curve according to the video frame image in the second video frame for each curve function in turn, and then the curves corresponding to all curve functions can be connected and indicated to an area range, that is, the anti-occlusion area range corresponding to the second video frame. Finally, the computing device 1 sets the anti-occlusion block corresponding to the anti-occlusion area range in the preset initial bullet screen mask of the second video frame according to the anti-occlusion area range, and takes the preset initial bullet screen mask which has been set the anti-occlusion block as the bullet screen mask corresponding to the second video frame.

During the process of the computing device 1 playing the live streaming video data through the live streaming software, when the second video frame is played, the computing device 1 can display the bullet screen data corresponding to the second video frame on the bullet screen mask corresponding to the second video frame. When the target bullet screen data is displayed on the bullet screen mask, the computing device 1 also determines whether the target bullet screen data overlaps with the anti-occlusion block, if the target bullet screen data overlaps with the anti-occlusion block, an overlapping part of the target bullet screen data is transparently displayed. Therefore, the computing device 1 can avoid the target object in the screen, such as the portrait, when the bullet screen data is displayed on the video screen through the bullet screen mask that has been set the anti-occlusion block. Through the above method, the anti-occlusion area of the bullet screen mask is used to control a visible area of the bullet screen, and the mask data is continuously updated as the video is played, so as to achieve the purpose of changing the visible area of the bullet screen as the video changes.

Figure 10:
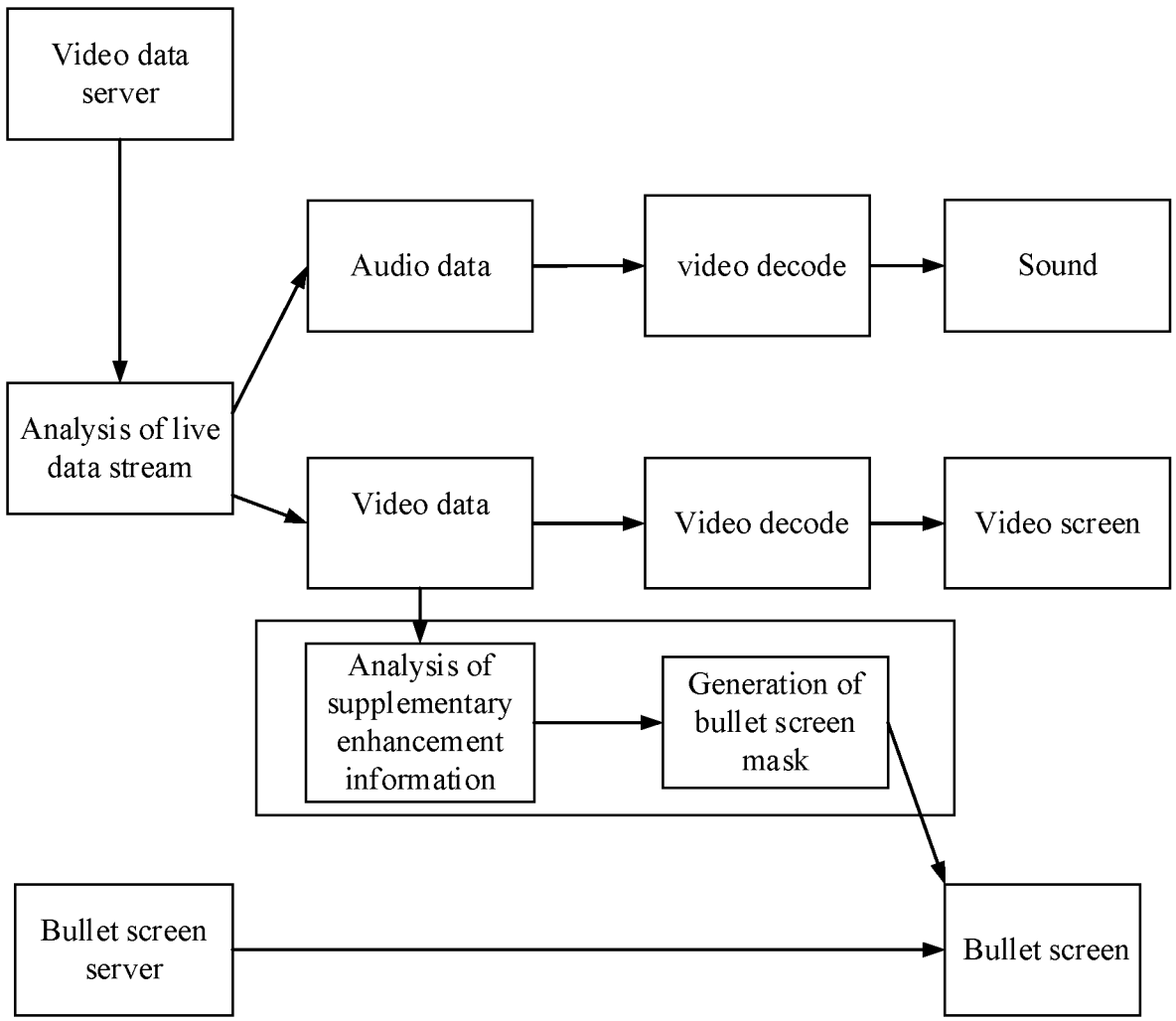
FIG. 10 is a flow effect diagram of a method for playing live streaming video according to a specific embodiment of the present application.

Please refer to FIG. 10, which is a flow effect diagram of a method for playing live streaming video according to an exemplary embodiment of the present invention.

In the embodiment, the computing device 1 receives live streaming data from the video data server and bullet screen data from the bullet screen server. Next, the computing device 1 parses the received live streaming data to obtain corresponding audio data and video data; then performs audio decoding on the audio data to output sound; at the same time, extracts supplementary enhancement information from the video data, and parses the supplementary enhancement information to obtain the corresponding anti-occlusion area data, and generates the corresponding bullet screen mask containing the anti-occlusion block according to the anti-occlusion area data; wherein the supplementary enhancement information is extracted from the video data, the video decoding will be performed, and then the video screen is output. While outputting the video screen, the computing device 1 displays the obtained bullet screen data on the bullet screen mask and overlays the video screen to form the bullet screen. Of course, if the bullet screen data overlaps with the anti-occlusion block in the bullet screen mask, the overlapping part of the target bullet screen data is displayed transparently.

Figure 11:
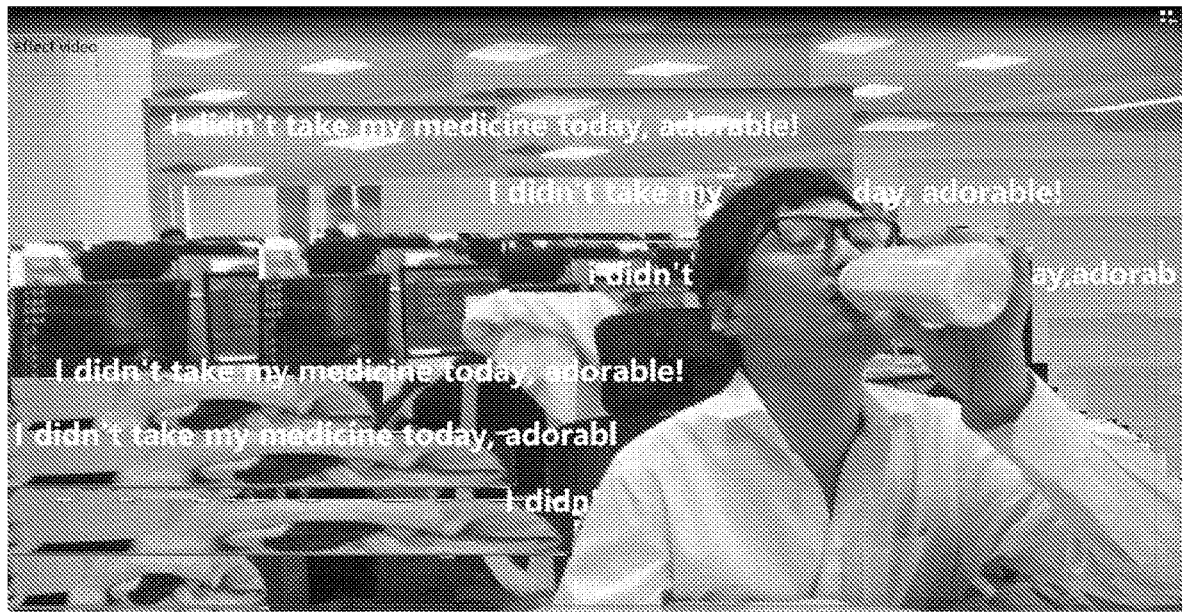
FIG. 11 is a bullet screen display effect diagram when playing a video according to a specific embodiment of the present application.

In the video data generation stage of the present application, the anti-occlusion area data is added to the corresponding video frame of the video data in a way of supplementing enhancement information; then in the video playing stage, after receiving the video data, the anti-occlusion area data is parsed from the video frame, and the corresponding bullet screen mask is generated, so as to realize the anti-occlusion display of bullet screen data. Please refer to FIG. 11, which is a bullet screen display effect diagram during video playing according to an exemplary embodiment of the present invention. Wherein, the bullet screen data can always avoid the area where the portrait is located.

Compared with the prior art, in the process of generating the live streaming video data, the present application can directly identify the anti-occlusion area data in the video frame, or extract the green screen or transparent channel contained in the live materials, and then set the anti-occlusion area data in the video frame to the corresponding video frame; so that during the video playing process, the corresponding anti-occlusion bullet screen mask can be quickly established according to the anti-occlusion area data in the video frame to achieve the anti-occlusion effect of the corresponding video frame; therefore, 1920×1080 resolution and a processing speed of 60 frames per second can be supported on an ordinary home computer, which does not rely on a server, and processes less data during the live streaming process, which can achieve an effect of high performance and stable performance.

Third embodiment

Figure 12:
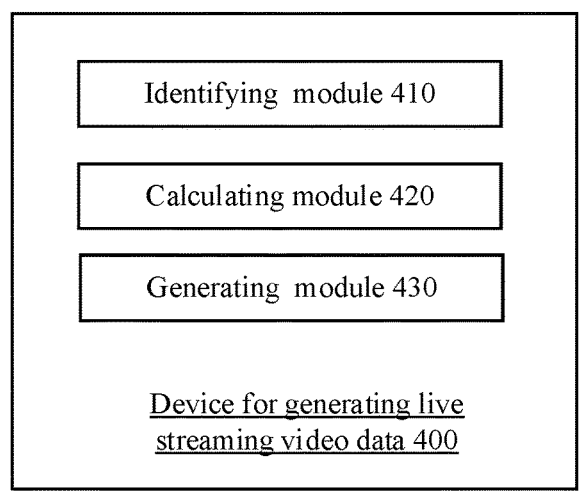
FIG. 12 is a schematic diagram of program modules of a device for generating live streaming video data according to an embodiment of the present application.

FIG. 12 schematically shows a block diagram of a device for generating live streaming video data according to a third embodiment of the present application, the device for generating live streaming video data may be divided into one or more program modules, and the one or more program modules are stored in a storage medium and executed by one or more processors to complete the embodiment of the present application. The program modules referred to in the embodiment of the present application refers to a series of computer program instruction segments capable of completing specific functions. The following description will specifically introduce the function of each program module in the embodiment.

As shown in FIG. 12, the device for generating live streaming video data 400 may include an identifying module 410, a calculating module 420 and a generating module 430, wherein:

The identifying module 410, is for obtaining live streamer video data, identifying target object data of a first video frame in the live streamer video data, wherein the first video frame is any video frame in the live streamer video data.

The calculating module 420, is for calculating the anti-occlusion area data of the first video frame according to the target object data.

The generating module 430, is for adding the anti-occlusion area data to a data packet corresponding to the first video frame to generate a second video frame of the live streaming video data.

In the exemplary embodiment, the identifying module 410 is further for: identifying the target object data in the first video frame through a preset target object recognition model; or when the live streamer video data is video data captured by a virtual camera, cutting out data in the first video frame except the target object data by means of a green screen matting, so as to obtain the target object data.

In the exemplary embodiment, the calculating module 420 is further for: performing a vector stroke on the target object data to obtain target object contour data of the first video frame;

marking an area covered by the target object contour data in the first video frame as an anti-occlusion area; and counting coordinate points within the anti-occlusion area, and calculating the anti-occlusion area data describing the anti-occlusion area. And, when the live streamer video data is real-time video data captured by a camera, the calculating module 420 is further for: obtaining video parameters for a video software to perform video screen synthesis on the first video frame; correcting the target object contour data according to the video parameters.

In the exemplary embodiment, the generating module 430 is further for: encoding the anti-occlusion area data according to a preset supplementary enhancement information format to obtain encoded anti-occlusion area data; and adding the encoded anti-occlusion area data to the data packet of an encoded first video frame encoded according to a preset video data format, wherein the video data format and the supplementary enhancement information format are mutually compatible data encoding formats.

Fourth embodiment

Figure 13:
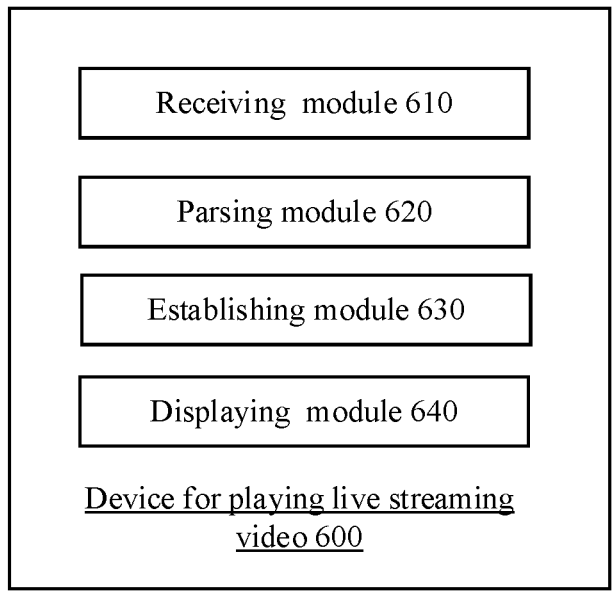
FIG. 13 is a schematic diagram of program modules of a device for playing live streaming video according to an embodiment of the present application.

FIG. 13 schematically shows a block diagram of a device for playing live streaming video according to a fourth embodiment of the present application, the device for playing live streaming video may be divided into one or more program modules, and the one or more program modules are stored in a storage medium and executed by one or more processors to complete the embodiment of the present application. The program modules referred in the embodiment of the present application refers to a series of computer program instruction segments capable of completing specific functions. The following description will specifically introduce the function of each program module in the embodiment.

As shown in FIG. 13, the device for playing live streaming video 600 may include a receiving module 610, a parsing module 620, an establishing module 630 and a displaying module 640, wherein:

The receiving module 610, is for receiving live streaming video data and corresponding bullet screen data.

The parsing module 620, is for parsing a second video frame of the live streaming video data, and directly extracting anti-occlusion area data of the second video frame, wherein the second video frame is any video frame in the live streaming video data.

The establishing module 630, is for establishing a bullet screen mask corresponding to the second video frame according to the anti-occlusion area data.

The displaying module 640, is for when the second video frame is played, displaying a target bullet screen data corresponding to the second video frame on the bullet screen mask.

In the exemplary embodiment, the establishing module 630 is further for: drawing an anti-occlusion area range on a video frame image of the second video frame according to the anti-occlusion area data; setting an anti-occlusion block corresponding to the anti-occlusion area range in a preset initial bullet screen mask of the second video frame, and taking the initial bullet screen mask having been set the anti-occlusion block as the bullet screen mask corresponding to the second video frame.

In the exemplary embodiment, the displaying module 640 is further for: when the target bullet screen data is displayed on the bullet screen mask, if the target bullet screen data overlaps the anti-occlusion block, transparently displaying an overlapping part of the target bullet screen data.

Fifth embodiment

Figure 14:
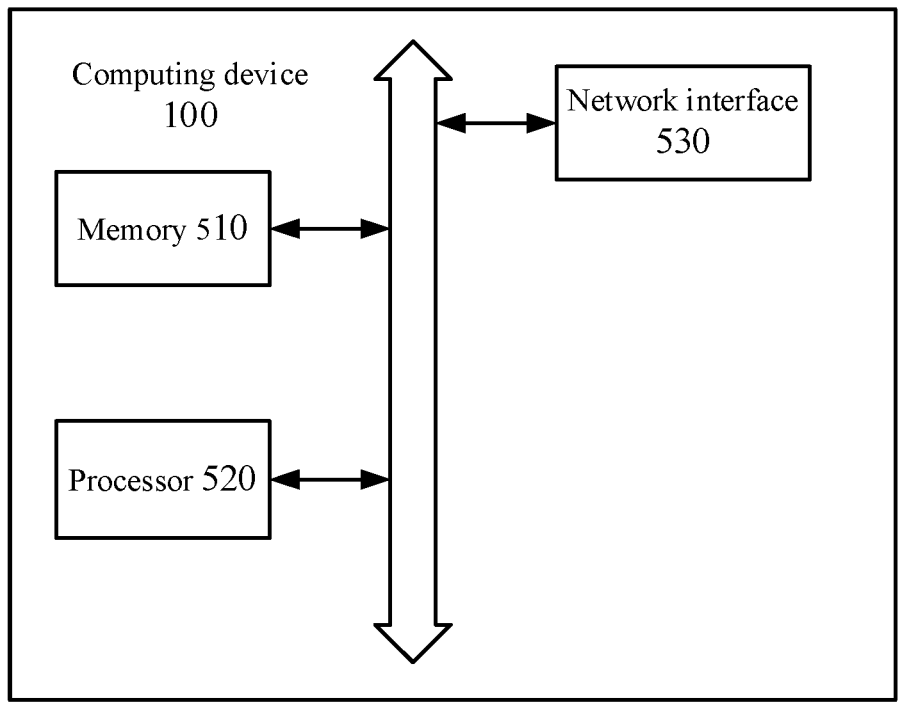
FIG. 14 is a schematic diagram of a hardware architecture of a computing device according to an optional embodiment of the present application.

FIG. 14 schematically shows a schematic diagram of a hardware architecture of a computing device 10 suitable for implementing a method for generating live streaming video data or a computing device 1 suitable for implementing a method for playing live streaming video according to a fifth embodiment of the present application. In the embodiment, the computing device 100 is a device capable of automatically performing numerical calculations and/or information processing according to predefined or stored instructions, such as can be a smart phone, a tablet, a laptop, a desktop computer, a rack server, a blade server, a tower server or a rack server (including independent servers, or server clusters composed of multiple servers), etc. As shown in FIG. 14, the computing device 100 includes, but is not limited to, a memory 510, a processor 520, a network interface 530 that can be communicated with each other through a system bus. Wherein:

The memory 510 includes at least one type of computer-readable storage medium. The readable storage medium includes a flash memory, a hard disk, a multimedia card, a card type memory (such as SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical dis and so on. In some embodiments, the memory 510 may be an internal storage module of the computing device 100 such as a hard disk or a memory of the computing device 100. In other embodiments, the memory 510 may also be an external storage device of the computing device 100, such as a plugged hard disk provided in the computing device 100, a Smart Media Card (SMC), a Secure Digital (SD) card, a flash memory card, and so on. Of course, the memory 510 may also include both an internal storage module and an external storage device of the computing device 100. In the embodiment, the memory 510 is generally used to store an operating system and various types of application software installed in the computing device 100 such as program codes of a method for generating live streaming video data or program codes of a method for playing live streaming video and the like. In addition, the memory 510 may also be used to temporarily store various types of data that have been or will be outputted.

The processor 520, in some embodiments, may be a Central Processing Unit (CPU), a controller, a microcontroller, a microprocessor, or other data processing chips. The processor 520 is generally used to control the overall operation of the computing device 100 such as performing control and processing related to data interaction or communication with the computing device 100. In the embodiment, the processor 520 is used to run program codes stored in the memory 510 or process data.

The network interface 530 may include a wireless network interface or a wired network interface which is generally used to establish a communication connection between the computing device 100 and other computing devices. For example, the network interface 530 is used for connecting the computing device 100 to an external terminal via a network and establishing a data transmission channel and a communication connection between the computing device 100 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and so on.

It is to be noted that FIG. 14 shows only the computing device having components 510-530, but it is understood that it is not required to implement all of the shown components and that more or fewer parts can be implemented in lieu thereof.

In the embodiment, the program codes of a method for generating live streaming video data or program codes of a method for playing live streaming video stored in the memory 510 may be divided into one or more program modules and executed by one or more processors (processor 520 in the embodiment) to complete the embodiment of the present application.

Sixth embodiment

The present application further provides a computer readable storage medium, which stores computer programs, and when the computer programs are executed by a processor to realize the steps of a method for generating live streaming video data in the first embodiment or the steps of a method for playing live streaming video in the second embodiment.

In the embodiment, the computer readable storage medium includes a flash memory, a hard disk, a multimedia card, a card type memory (such as SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk and so on. In some embodiments, the computer-readable storage medium may be an internal storage module of the computing device such as a hard disk or memory of the computing device. In other embodiments, the memory may also be an external storage device of the computing device, such as a plugged hard disk provided in the computing device, a Smart Media Card (SMC), a Secure Digital (SD) card, a flash memory card, and so on. Of course, the computer readable storage medium may also include both an internal storage module and an external storage device of the computing device. In the embodiment, the computer-readable storage medium is generally used to store an operating system and various types of application software installed in the computing device such as program codes of a method for generating live streaming video data or program codes of a method for playing live streaming video and the like. In addition, the memory may also be used to temporarily store various types of data that have been or will be outputted.

Apparently, it should be appreciated by those skilled in the art that each module or step described in the embodiment of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the embodiment of the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method for generating live streaming video data, comprising:
   obtaining live broadcasting video data;
   identifying a target object in a first video frame, wherein the first video frame is any video frame comprised in the live broadcasting video data;
   determining a target area based on the target object in the first video frame, wherein the target area is an area not to be occluded by any item;
   encoding data indicative of the target area based on a predetermined format for supplementary enhancement information to obtain encoded target area data; and
   adding the encoded target area data to a data packet corresponding to the first video frame, wherein the data packet is encoded based on a predetermined video data format, wherein the predetermined video data format and the predetermined format for supplementary enhancement information are mutually compatible data encoding formats, wherein a bullet screen mask corresponding to the video frame is to be generated based on extracting the encoded target area data, wherein one or more comments associated with the video frame are to be displayed on the bullet screen mask, and wherein the bullet screen mask is configured to control display visibility of the one or more comments.

2. The method of claim 1, wherein the determining a target area based on the target object in the first video frame further comprises:
    determining a contour of the target object in the first video frame; and
    identifying an area covered by the contour of the target object in the first video frame as the target area.

3. The method of claim 2, wherein when the live broadcasting video data are real-time video data captured by a camera, the method further comprises:
    obtaining video parameters of performing video image synthesis on the first video frame by a video software tool; and
    correcting the contour of the target object based on the video parameters.

4. The method of claim 1, wherein the identifying a target object in a first video frame further comprises:
    identifying the target object in the first video frame using a preset target object recognition model; or
    when the live broadcasting video data are video data captured by a virtual camera, removing other data in the first video frame than data indicative of the target object by means of green screen matting.

5. A method for playing live streaming video, comprising:
    receiving live streaming video data comprising video frames and corresponding bullet screen data, wherein the corresponding bullet screen data comprise comments to be presented relative to the video frames;
    parsing data associated with a video frame among the video frames comprised in the live streaming video data, wherein the data associated with the video frame further comprise target area data encoded based on a predetermined format for supplementary enhancement information, the predetermined format for supplementary enhancement information is compatible with a predetermined video data format for encoding a data packet corresponding to the video frame, and the target area data comprise data indicative of a target area corresponding to a target object in the video frame;
    extracting the data indicative of the target area corresponding to the target object in the video frame;
    generating a bullet screen mask corresponding to the video frame based at least in part on the extracted data, wherein the bullet screen mask is configured to control visibility of one or more comments associated with the video frame; and
    displaying the one or more comments relative to the video frame on the bullet screen mask while displaying the video frame.

6. The method of claim 5, wherein the generating a bullet screen mask corresponding to the video frame based at least in part on the extracted data further comprises:
    generating the bullet screen mask corresponding to the video frame by setting the target area in a preset initial bullet screen mask of the video frame.

7. The method of claim 6, further comprising:
    transparently displaying the at least one comment when the at least one comment overlaps the target area in the bullet screen mask.

8. A system of generating live streaming video data, comprising:
    at least a processor; and
    at least a memory communicatively coupled to the at least a processor to configure the at least a processor to perform operations comprising:
        obtaining live broadcasting video data;
        identifying a target object in a first video frame, wherein the first video frame is any video frame comprised in the live broadcasting video data;
        determining a target area based on the target object in the first video frame, wherein the target area is an area not to be occluded by any item;
        encoding data indicative of the target area based on a predetermined format for supplementary enhancement information to obtain encoded target area data; and
        adding the encoded target area data to a data packet corresponding to the first video frame, wherein the data packet is encoded based on a predetermined video data format, wherein the predetermined video data format and the predetermined format for supplementary enhancement information are mutually compatible data encoding formats, wherein a bullet screen mask corresponding to the video frame is to be generated based on extracting the encoded target area data, wherein one or more comments associated with the video frame are to be displayed on the bullet screen mask, and wherein the bullet screen mask is configured to control display visibility of the one or more comments.

9. The system of claim 8, wherein the determining a target area based on the target object in the first video frame further comprises:
    determining a contour of the target object in the first video frame; and
    identifying an area covered by the contour of the target object in the first video frame as the target area.

10. The system of claim 9, wherein when the live broadcasting video data are real-time video data captured by a camera, the method further comprises:
    obtaining video parameters of performing video image synthesis on the first video frame by a video software tool; and
    correcting the contour of the target object based on the video parameters.

11. The system of claim 8, wherein the identifying a target object in a first video frame further comprises:
    identifying the target object in the first video frame using a preset target object recognition model; or
    when the live broadcasting video data are video data captured by a virtual camera, removing other data in the first video frame than data indicative of the target object by means of green screen matting.

12. A non-transitory computer-readable storage medium bearing computer-readable instructions that upon execution on a computing device cause the computing device at least to perform operations comprising:
    obtaining live broadcasting video data;
    identifying a target object in a first video frame, wherein the first video frame is any video frame comprised in the live broadcasting video data;
    determining a target area based on the target object in the first video frame, wherein the target area is an area not to be occluded by any item;
    encoding data indicative of the target area based on a predetermined format for supplementary enhancement information to obtain encoded target area data; and
    adding the encoded target area data to a data packet corresponding to the first video frame, wherein the data packet is encoded based on a predetermined video data format, wherein the predetermined video data format and the predetermined format for supplementary enhancement information are mutually compatible data encoding formats, wherein a bullet screen mask corresponding to the video frame is to be generated based on extracting the encoded target area data, wherein one or more comments associated with the video frame are to be displayed on the bullet screen mask, and wherein the bullet screen mask is configured to control display visibility of the one or more comments.

13. The non-transitory computer-readable storage medium of claim 12, wherein the determining a target area based on the target object in the first video frame further comprises:
   determining a contour of the target object in the first video frame; and
   identifying an area covered by the contour of the target object in the first video frame as the target area.

14. The non-transitory computer-readable storage medium of claim 13, wherein when the live broadcasting video data are real-time video data captured by a camera, the method further comprises:
   obtaining video parameters of performing video image synthesis on the first video frame by a video software tool; and
   correcting the contour of the target object based on the video parameters.

15. The non-transitory computer-readable storage medium of claim 12, wherein the identifying a target object in a first video frame further comprises:
   identifying the target object in the first video frame using a preset target object recognition model; or
   when the live broadcasting video data are video data captured by a virtual camera, removing other data in the first video frame than data indicative of the target object by means of green screen matting.

\* \* \* \* \*